US010820389B2

(12) United States Patent
Blum et al.

(10) Patent No.: US 10,820,389 B2
(45) Date of Patent: Oct. 27, 2020

(54) DRIVING A LIGHTING ELEMENT

(71) Applicant: SIGNIFY HOLDING B.V., Eindhoven (NL)

(72) Inventors: Martinus Wilhelmus Blum, Eindhoven (NL); Theo Gerrit Zijlman, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 79 days.

(21) Appl. No.: 15/526,053

(22) PCT Filed: Nov. 2, 2015

(86) PCT No.: PCT/EP2015/075402
§ 371 (c)(1),
(2) Date: May 11, 2017

(87) PCT Pub. No.: WO2016/074961
PCT Pub. Date: May 19, 2016

(65) Prior Publication Data
US 2017/0332450 A1 Nov. 16, 2017

(30) Foreign Application Priority Data
Nov. 11, 2014 (EP) ..................................... 14192662

(51) Int. Cl.
*H05B 45/37* (2020.01)
*H05B 45/10* (2020.01)
*H05B 45/50* (2020.01)

(52) U.S. Cl.
CPC ............. *H05B 45/37* (2020.01); *H05B 45/10* (2020.01); *H05B 45/50* (2020.01)

(58) Field of Classification Search
CPC ............ H05B 33/0815; H05B 33/0845; H05B 33/0851; H05B 33/089; H05B 37/02
(Continued)

(56) References Cited

U.S. PATENT DOCUMENTS 8,232,735 B2    7/2012 Shteynberg et al.
10,027,418 B2*  7/2018 Brilman ............... H04B 10/116
(Continued)

FOREIGN PATENT DOCUMENTS

EP      2547174 A2    1/2013
JP      2004120101 A  4/2004
(Continued)

*Primary Examiner* — Alexander H Taningco
*Assistant Examiner* — Amy X Yang
(74) *Attorney, Agent, or Firm* — Meenakshy Chakravorty

(57) ABSTRACT

An analogue dimmer driver for driving an LED lighting element (54) to generate coded light comprises an output component (54) which provides a primary current ($i_{pr}$), a capacitor (53) connected to the output component, a switch (S1) via which the lighting element is connectable to the current source in parallel with the capacitor. Switching is performed by periodically opening and closing the switch to code information into light generated by the lighting element. The output component has an input configured to receive a dimming signal. Responsive to a change in the dimming signal: i) the primary current is increased so as to increase the average power of the generated light and ii) the duty cycle of the switching is increased by an amount sufficient to prevent the peak level of the current though the lighting element when the switch is closed ($i_{pr}+i_{dis}$) from exceeding a predetermined level ($i_{nom}$).

15 Claims, 7 Drawing Sheets

(58) Field of Classification Search
USPC .................. 315/291–297, 185 R, 307–308
See application file for complete search history.

(56) References Cited

U.S. PATENT DOCUMENTS

| | | |
|---|---|---|
| 2008/0258641 A1 | 10/2008 | Nakagawa et al. |
| 2013/0015784 A1 | 1/2013 | Kamada et al. |
| 2013/0015785 A1* | 1/2013 | Kamada ............... H04B 10/116 |
| | | 315/297 |
| 2013/0038227 A1 | 2/2013 | Yan et al. |
| 2013/0069545 A1* | 3/2013 | Seo ........................ H05B 45/37 |
| | | 315/186 |
| 2013/0202310 A1* | 8/2013 | Rietman ............ H05B 37/0272 |
| | | 398/128 |
| 2015/0181670 A1* | 6/2015 | Zhang ................... H05B 45/10 |
| | | 315/209 R |
| 2016/0119988 A1* | 4/2016 | Ruan ..................... H05B 45/10 |
| | | 315/186 |

FOREIGN PATENT DOCUMENTS

| | | |
|---|---|---|
| JP | 2014135716 A | 7/2014 |
| RU | 2479955 C2 | 4/2013 |
| WO | 2012052935 A1 | 4/2012 |
| WO | 2013064960 A1 | 5/2013 |

\* cited by examiner

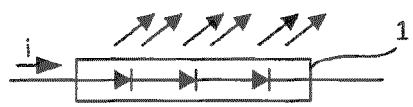
Figure 1A
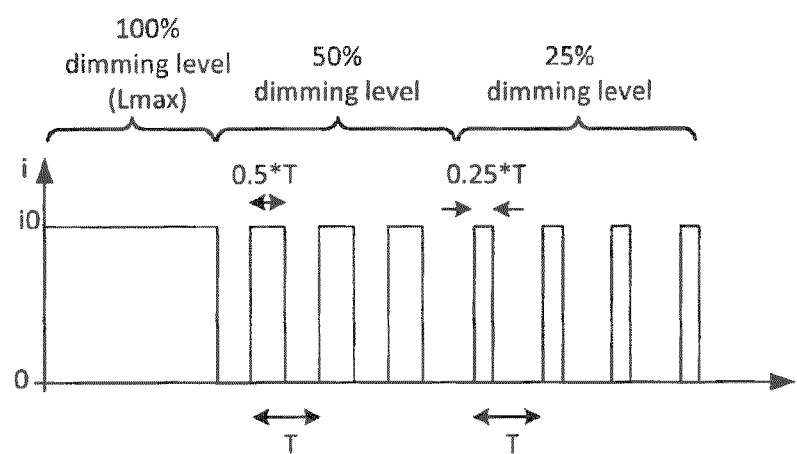
Figure 1B (PWM)
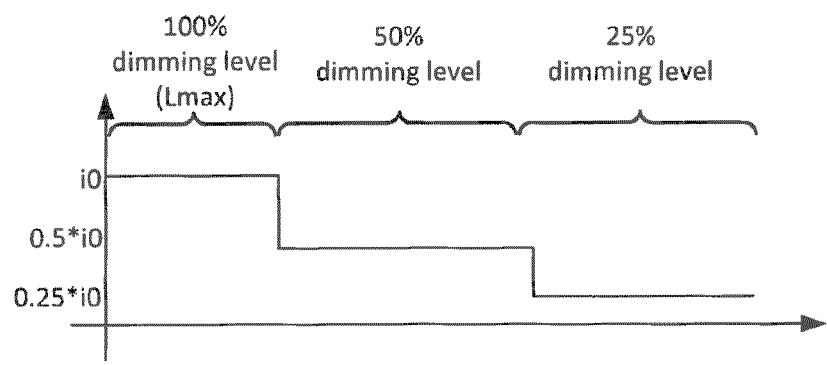
Figure 1C (Analogue)

DRIVING A LIGHTING ELEMENT

CROSS-REFERENCE TO PRIOR APPLICATIONS

This application is the U.S. National Phase application under 35 U.S.C. § 371 of International Application No. PCT/EP2015/075402, filed on Nov. 2, 2015, which claims the benefit of European Patent Application No. 14192662.6, filed on Nov. 11, 2014. These applications are hereby incorporated by reference herein.

TECHNICAL FIELD

The present disclosure relates to a mechanism for driving a lighting element, which mechanism has both dimming and coded light functionality.

BACKGROUND

Coded light refers to techniques whereby data is embedded in the light emitted by a light source such as an everyday luminaire. The light typically comprises both a visible illumination contribution for illuminating a target environment such as room (typically the primary purpose of the light), and an embedded signal for providing information into the environment. To do this, the light is modulated at a certain modulation frequency or frequencies, preferably a high enough frequency so as to be beyond human perception and therefore not affecting the primary illumination function. In some cases, a coded light emitter might not have an illumination function at all. In that case, visible light or invisible infra-red light can be used as the medium for transmitting information.

In some of the simplest cases, the signal may comprise a single waveform or even a single tone modulated into the light from a given luminaire. The light emitted by each of a plurality of luminaires may be modulated with a different respective modulation frequency that is unique amongst those luminaires, and the modulation frequency can then serve as an identifier of the luminaire or its light. For example this can be used in a commissioning phase to identify the contribution from each luminaire, or during operation can be used to identify a luminaire in order to control it remotely (e.g. via an RF back channel). In another example, the identification can be used for navigation or other location-based functionality, by mapping the identifier to a known location of a luminaire or information associated with the location.

In other cases, a signal comprising more complex data may be embedded in the light. For example using amplitude keying the amplitude of the light may be varied to encode data, e.g. using high and low levels to represent bits or using a more complex modulation scheme to represent different symbols. Or using frequency keying, a given luminaire is operable to emit on two (or more) different modulation frequencies and to transmit data bits (or more generally symbols) by switching between the different modulation frequencies.

Information may be coded into light generated by an LED ("Light Emitting Diode") lamp or other LED lighting element. An LED lighting element typically comprises multiple LEDs which can be connected in a number of configurations. One of the simplest configurations is to connect the component LEDs in series to form an "LED string", though other more complicated configurations (such as multiple strings connected in parallel) are also possible. FIG. 1A shows a string 1 of LEDs, through which flows a current i.

EP2547174A2 discloses an illumination light communication device performing visible light communication by modulating an intensity of illumination light, wherein a number of LEDs are place in series to form such a LED string.

The electrical circuit used to power an LED should provide enough current to light the LED but not so much as to damage the LED or reduce its efficacy. For low-power LEDs such as those used as indicators on electronic devices, a resistor can be used to limit the current supplied to the LED from a fixed DC voltage source. However, when driving high-powered LEDs of the kind used for illumination, more complex driver circuits (drivers) are required to achieve efficient and controlled operation of the LEDs. One type of driver circuit comprises a constant current source which delivers a DC electric current that is substantially independent of the voltage across the constant current source. This can be achieved by using a resistor to sense the current outputted by the constant current source, with feedback from the resistor being used to maintain the outputted current at a level which matches a reference level.

In the context of illumination, it is sometimes desirable to provide a dimming mechanism i.e. a mechanism by which the average luminous flux of the LED lamp ("light output") can be varied to different desired levels. Luminous flux or luminous power, expressed e.g. in lumens, is a measure of the power of the light emitted by the lamp, adjusted to account for the varying sensitivity of a human eye to different wavelengths. "Average" in this context means a mean value over a window of time long enough to smooth out any oscillation in the output of the lamp that is fast enough to be beyond the limit of human perception, such as that resulting from coding of information into the light.

One type of dimming is pulse width modulation (PWM) dimming, in which an LED string 1 is driven by a constant current i0 that is periodically suppressed with period T i.e. so that over each period T the constant current i0 is only permitted to flow though the string 1 for a fraction dc*T of the period T where dc is referred to as the duty cycle of the PWM. The period T is sufficiently small that 1/T is above the human perception threshold so that, to the human eye, the light output of the string 1 is approximately dc*Lmax where Lmax is the light output when the current i0 is unsuppressed. This is illustrated in FIG. 1B, which shows how the duty cycle dc can be changed to provide dimming levels of 50% and 25% respectively. Note that the amount of current which flows through the string 1 during unsuppressed intervals is always i0, irrespective of the dimming level; all that changes is the duty cycle.

Dimming mechanisms have been used to provide color tuneable lamps, such as the Philips™ Hue family of products. These are LED lamps that can be controlled through Zigbee Light Link (and via WiFi using a bridge). A dual stage driver comprises i) a voltage source which converts from mains to an intermediate DC voltage and ii) a current source with constant current. The current source is implemented with a current control loop having a relatively high bandwidth i.e. which maintains the set current even in the presence of high frequency load variations. LEDs of different color points are placed in series, and the intensity of each color channel is changed by using a by-pass switch controlled by a PWM signal i.e. PWM dimming is used on each color channel individually to provide control over the color balance.

US2013/015784 discloses a mechanism in which PWM is used to effect dimming control, and visible light communication is carried out by modulating the light intensity of the illumination light using a four pulse point position modulation (4PPM) scheme.

Another type of dimming is analogue dimming, in which an LED string 1 is driven by a current i which is varied to change the dimming level. This is illustrated in FIG. 1C, which shows how dimming levels of 50% and 25% can be achieved by reducing the current i to 0.5 and 0.25 of the Lmax-producing current i0.

Analogue and PWM dimming each have their own advantages and drawbacks in terms of both performance and cost. In practice, there will be some degree of trade-off between cost and performance which ultimately dictates which is chosen for a particular driver architecture.

SUMMARY

PWM dimming gives a 'free' implementation for coded light in that light coding functionality can be incorporated into the PWM dimming mechanism with minimal or no additional circuitry: for a frequency modulation scheme (in which the data is embedded in the light by modulating the frequency of the light, and the frequency is detected to decode), the PWM frequency is simply set to the frequency that is needed by the coded light application (typically between 200 Hz and 800 Hz). The frequency can be set and varied as desired to effect the coding independently of the duty cycle, and thus without affecting the average output of the lamp.

However, in some contexts, an analogue dimming architecture may be more appropriate than PWM e.g. because it can be implemented using fewer circuit components and thus at a lower cost. For example, an analogue dimming architecture may be more appropriate in some circumstances to provide dimming functionality for a straightforward white LED lamp. However, analogue dimming is not as immediately conducive to the incorporation of coded light functionality.

The present disclosure provides a driving mechanism which has both analogue dimming and coded light functionality.

A first aspect is directed to an analogue dimmer driver for driving an LED lighting element to generate coded light. The driver comprises an output component, a capacitor connected to the output component, a switch and a controller, and wherein the output component is one of a controllable constant current source and a controllable constant power source. The output component is configured to provide a primary current. The lighting element is connectable via the switch to the output component in parallel with the capacitor, so that when the switch is open the primary current charges the capacitor, and when the switch is closed the capacitor discharges to generate a discharge current so that the lighting element is driven by a drive current which comprises the discharge and primary currents. The controller is configured to perform switching by periodically opening and closing the switch to code information into light generated by the lighting element. The current source has an input configured to receive a dimming signal corresponding to a dimming level (dl). Responsive to a change in the dimming signal which indicates that an increase in the average power of the generated light is desired: i) the primary current is increased so as to increase the average power of the generated light and ii) the duty cycle of the switching is increased such that it is greater than or equal to the dimming level, thereby preventing the peak level of the drive current from exceeding a predetermined level.

Analogue dimming is effected by changing the actual current outputted by the current source (i.e. the primary current), whilst coding is effected by the switching. The capacitor ensures that the switching has no appreciable dimming effect per se i.e. no appreciable effect on the average power of the generated light so that the dimming level is set entirely by the level of the primary current (and thus by the dimming signal which dictates the level of that current). This is because, at times when the switch is open to disconnect the lighting element, the energy that would otherwise be delivered 'directly' to the lighting element by the current source is instead delivered to and stored by the capacitor and then 'indirectly' delivered to the lighting element by the discharging capacitor when the switch is subsequently closed. Thus, the average power output of the lighting element for a given primary current is substantially the same with the switching as it would be without the switching (i.e. if it were simply driven by the primary current continuously), and only changes when the primary current itself is changed.

Moreover, in contrast to PWM dimming (such as that of US2013/015784), changing the duty cycle of the switching of the present disclosure (that is, the fraction of the switching period for which the switch is closed) does not appreciably change the average power of the generated light i.e. in contrast to PWM dimming, changing the duty cycle of the present disclosure has no appreciable dimming effect per se. This is because, whatever the duty cycle of the switching of the present disclosure, substantially the same amount of energy is delivered to the lighting element for a given primary current over the course of a switching period—a shorter (resp. longer) duty cycle, i.e. with the switch closed for a lesser (resp. greater) fraction of the switching period, simply means more (resp. less) of this energy is delivered 'indirectly' via the capacitor than 'directly' from the current source.

However, the inventors have appreciated that, even though the average level of the drive current is substantially independent of the duty cycle, the peak level of drive current is not. This is because, for a shorter duty cycle the total energy that needs to be delivered to the lighting element over the course of a switching period needs to be so delivered in a shorter amount of time (as the switch is closed for less time), resulting in higher peak currents. Thus, were the duty cycle e.g. to remain fixed, this peak level would increase whenever the primary current is increased. Such fixed-duty-cycle switching would provide no control over the peak level of the drive current, which could damage the lighting element or at least reduce its efficacy.

By changing the switching duty cycle in dependence on the dimming signal which controls the primary current in the above-noted manner, the driver of the present disclosure provides a mechanism by which the peak level of the drive current can be regulated to maintain it at or below the predetermined level, which can for instance be set to match a nominal current associated with the LED lighting element (see below).

In embodiments, the peak level of the drive current prior to said change may be at the predetermined level and the amount by which the duty cycle is increased may be such that the peak level of the drive current remains at the predetermined level.

The controller may have an input configured to receive data and may be configured to embed the data in the generated light by changing the frequency or the duty cycle of the switching in dependence on the data.

The frequency of the switching may be above 50 Hz.

The output component may comprise a control loop which matches the primary current or an output related to the primary current to a setpoint of the control loop, and the primary current may be increased by increasing the setpoint. The output related to the primary current may be the electrical power provided by the output component. The setpoint may be adjusted at a frequency below 50 Hz.

The driver may comprise a low-pass filter, the dimming signal may be filtered by the low-pass filter before being received by the output component, and the switching may be performed using a version of the dimming signal not filtered by the low-pass filter.

The switch may be a transistor.

The driver may comprise a temperature protection circuit configured to reduce the primary current when the temperature of the lighting element increases above a predetermined limit.

According to a second aspect, a lighting apparatus comprises an LED lighting element, and an analogue dimmer driver configured to drive the lighting element to generate coded light. The driver comprises an output component, a capacitor connected to the output component, a switch and a controller and wherein the output component is one of a controllable constant current source and a controllable constant power source. The output component is configured to provide a primary current. The lighting element is connectable via the switch to the output component in parallel with the capacitor, so that when the switch is open the primary current charges the capacitor, and when the switch is closed the capacitor discharges to generate a discharge current so that the lighting element is driven by a drive current which comprises the discharge and primary currents. The controller is configured to perform switching by periodically opening and closing the switch to code information into light generated by the lighting element. The current source has an input configured to receive a dimming signal corresponding to a dimming level. Responsive to a change in the dimming signal which indicates that an increase in the average power of the generated light is desired: i) the primary current is increased so as to increase the average power of the generated light and ii) the duty cycle of the switching is increased such that it is greater than or equal to the dimming level, thereby preventing the peak level of the drive current from exceeding a predetermined level.

The predetermined level may match a nominal current associated with the lighting element.

A third aspect is directed to a method for controlling an LED lighting element to generate coded light. The lighting element is connected to an output component via a switch in parallel with a capacitor also connected to the output component and wherein the output component is one of a controllable constant current source and a controllable constant power source. The output component is configured to provide a primary current, so that when the switch is open the primary current charges the capacitor, and when the switch is closed the capacitor discharges to generate a discharge current so that the lighting element is driven by a drive current which comprises the discharge and primary currents. Switching is performed by periodically opening and closing the switch to code information into light generated by the lighting element. Responsive to receiving an indication corresponding to a dimming level that an increase in the average power of the generated light is desired: i) the primary current is increased so as to increase the average power of the generated light, and ii) the duty cycle of the switching is increased such that it is greater than or equal to the dimming level, thereby preventing the peak level of the drive current from exceeding a predetermined level.

According to a fourth aspect, a computer program product comprises code stored on a computer readable storage medium which, when executed, implements the method of the third aspect.

BRIEF DESCRIPTION OF THE FIGURES

To aid understanding of the subject matter and to show how embodiments may be put into effect, reference will now be made by way of example to the following drawings in which:

FIG. 1A shows an LED string;

FIG. 1B illustrates principles underlying a PWM dimming mechanism;

FIG. 1C illustrates principles underlying an analogue dimming mechanism;

DETAILED DESCRIPTION

Figure 2:
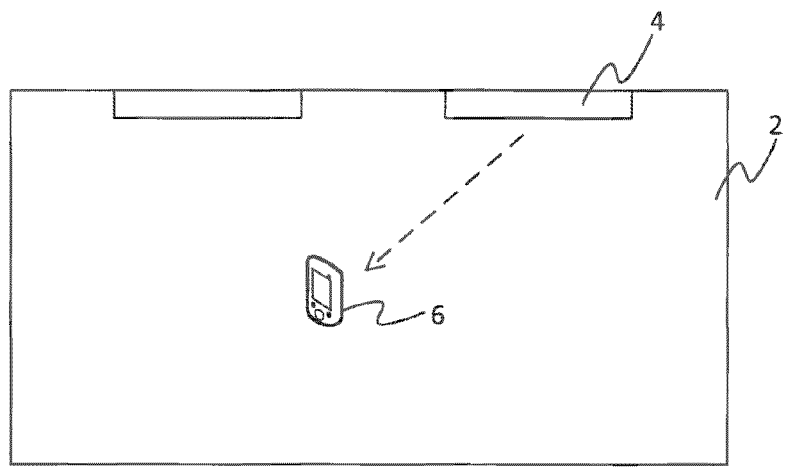
FIG. 2 schematically illustrates a space comprising a lighting system and camera.

FIG. 2 shows an example environment 2 in which embodiments disclosed herein may be deployed. For instance the environment may comprise one or more rooms and/or corridors of an office, home, school, hospital, museum or other indoor space; or an outdoor space such as a park, street, stadium or such like; or another type of space such as a gazebo or the interior of a vehicle. The environment 2 is installed with a lighting system comprising at least one lighting device 4 in the form a luminaire. Also present in the environment 2 is a user terminal 6, preferably a mobile device such as a smart phone or tablet. The luminaire 4 comprises a LED lighting element in the form of an LED lamp (54, not shown in FIG. 1 but shown in later figures) which is a string of LEDs in this embodiment, but may be a single LED or other type of array of LEDs (e.g. multiple strings in parallel) in other embodiments. The light emitted by the lamp of each of the one or more luminaires is modulated with a coded light component at a frequency imperceptible to the human eye.

Figure 3:
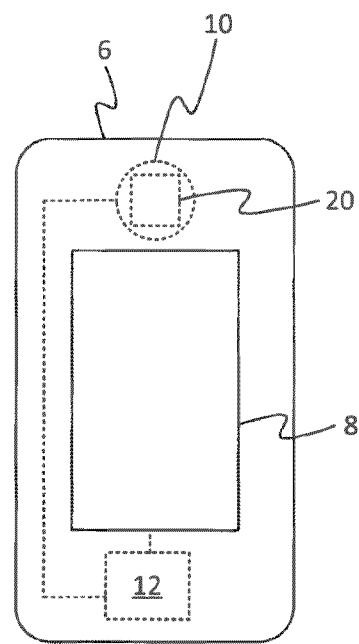
FIG. 3 is a schematic block diagram of a device with camera for receiving coded light.

FIG. 3 gives a block diagram of the mobile device 6. The device 6 comprises a user interface 8 (preferably a display such as a screen or touchscreen), a camera 10 having a two-dimensional image capture element 20, and an image analysis module 12 coupled to the image capture element 20 and user interface 8. The image analysis module 12 is operable to process signals representing images captured by the image capture element, and based thereon to decode coded light components in the light from which the image was captured. The image analysis module 12 may be implemented in the form of code stored on a computer readable storage medium or media and arranged to be executed on a processor comprising one or more processing units. Alternatively it is not excluded that some or all of the image analysis module 12 could be implemented in dedicated hardware circuitry or reconfigurable circuitry such as an FPGA. Although portable devices, such as mobile phones, tablets, or dedicated control devices can be fitted with a camera, it may also be possible to use a light sensitive diode for sensing the coded light. This may be particularly interesting for low cost remote control devices that can receive the coded light output by a light source, to obtain identity and/or access control information from the light source for control purposes.

Figure 4:
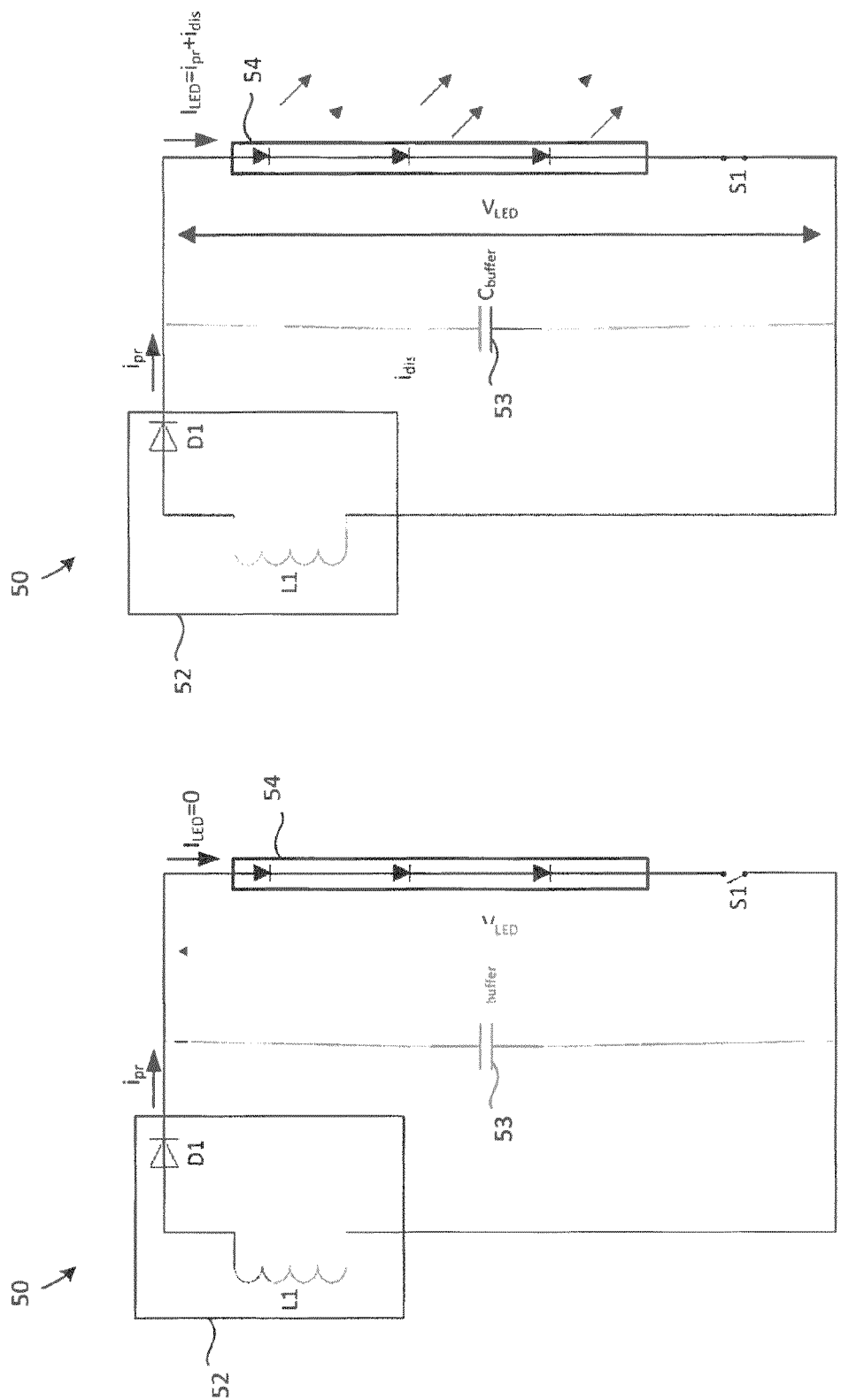
FIGS. 4A and 4B schematically illustrate part of a lighting apparatus when a lighting element is disconnected from and connected to a driver respectively.

FIGS. 4A and 4B schematically illustrate part of a lighting apparatus 50, which can be embodied in the luminaire 4 mentioned above. The lighting apparatus 50 comprises a controllable current source 52 connected to a capacitor 53 having a capacitance $C_{buffer}$, an LED lamp, which is a string of LEDs 54, and a switch S1 connected in series with the lamp 54 so that the lamp 54 can be disconnected from (by opening the switch S1) and reconnected to (by closing the switch S1) the current source 52 in parallel with the capacitor 53. A current $I_{LED}$ (LED current) flows thought the string 54, which changes between zero and non-zero levels as the switch S1 is opened and closed.

The current source 52, capacitor 53 and switch S1 constitute an analogue dimmer driver (i.e. a driver which has analogue dimming functionality) which drives the string 54. The driver also has coded light functionality, whereby information is coded into the light generated by the string 54 by modulation (see below) at a coded light frequency, which may be fixed (e.g. to covey a simple identifier of the apparatus) or variable (to code more complex signals).

The current source 52 provides a primary current $i_{pr}$, which is DC and substantially independent of the voltage across the current source 52 and which is thus substantially independent of the load circuit formed by the capacitor 53, lighting source 54 and switch S1.

In FIGS. 4A and 4B, only part of the current source 52 is shown; in this case a secondary winding L1 and secondary diode D1 of a flyback topology. As will be apparent, these drawings are merely schematic examples and the principles of the subject matter can be applied to many constant current source (or constant power source) topologies.

The driver is a single stage in that the primary current $i_{pr}$ is generated directly from mains power. The single stage nature of the driver reduces the cost of the driver, but in other embodiments the driver may have multiple stages.

The independence of $i_{pr}$ is effected by a current control loop (not shown), which maintains the primary current at substantially a reference level (setpoint) irrespective of the behavior of the remaining circuitry. Such current control loops are known in the art. Analogue dimming of the string 54 is done by modulating the current setting of the current source 52 to change the primary current $i_{pr}$. Specifically, the power to the string 54 is reduced/increased by reducing/increasing the setpoint of the current control loop, the setpoint being conveyed to the current source 52 by the dimming signal dim. Note the "setpoint" means the desired level of the primary current, and that "increasing (resp. decreasing) the setpoint" means any adjustment of the setpoint which causes the desired increase (resp. decrease) in the level of the primary current, independent of the manner in which it is conveyed by the dimming signal.

In other embodiments, a constant power source (i.e. which generates an electrical power level that is substantially independent of the load circuit) can be used in place of the current source 52. In this case, the electrical power provided by the power source is matched to a changeable setpoint of a suitable control loop.

Practical implementations of current or power sources will be non-ideal and show some dependence on the load circuit.

In order to prevent changes in the primary current from disrupting the information which is coded in the light at high frequencies (e.g. above 50 Hz), the frequency at which the setpoint is changed is upper-limited (e.g. to be below 50 Hz).

The same (PWM) signal can be used to control the setpoint of the current source and the switching of switch S1, but in this case there needs to be a low-pass filter on the dimming input of the current source to prevent high frequency changes in the primary current (e.g. with a threshold at or near 50 Hz). The dimming signal dim is a filtered version of this signal (i.e. filtered by the low-pass filter) and the switching signal sw is an unfiltered version of this signal (i.e. not filtered by the low-pass filter).

The current (or power) control loop may also be of low bandwidth i.e. less than the coding modulation frequency (e.g. below 50 Hz). The bandwidth of the control loop is not the most important parameter though—even with a bandwidth close to the modulation frequency, the circuit will still operate (though the functionalities might start interacting).

A nominal current $i_{nom}$ is defined as the current that is necessary for the lamp 54 to reach a 100% light level. The power output of the lamp 54 when driven at its nominal current is called the nominal power. The efficacy of LED modules typically depends on temperature and current level (as they exhibit non-linear behavior). Currents above the nominal current will lead to a lower LED efficacy. Moreover, this will in turn lead to an operating temperature that is above the maximum operating temperature of the LEDs, which will reduce the life of the LEDs.

To dim the output, the primary current $i_{pr}$ is set to a fraction "dl" of the nominal current $i_{nom}$ i.e.

$$i_{pr} = dl * i_{nom}$$

where $0 \leq dl \leq 1$. The fraction "dl" is referred to as the dimming level, and the current dimming level represents the fraction of the nominal power currently being outputted by the lamp 54. By changing the setpoint of the current control loop, a desired dimming level dl can be achieved.

To effect coding, the switch S1 is opened and closed at the coded light frequency.

When the switch S1 is opened (FIG. 4A), $I_{LED}=0$ and the LED string will consume no power, but the converter will still deliver the primary current $i_{pr}$ to the capacitor 53. As a result the buffer capacitor will be charged to voltage $v_{pr} + v_{offset} + v_m$ where $$v_m = \left(\frac{i_{pr}}{C_{buffer}}\right) * t_{off} \text{ and } t_{off}$$

is the duration over which the switch remains open; $v_{pr} = i_{pr} * R$ where R is the large signal resistance of the LED string 54 which can be defined as (very much simplified) $R = (Vf + I\_LED * R_s)/I_{LED}$, where Vf is the forward voltage of the LED string, and $R_s$ is the small signal resistance of the string 54; $v_{offset}$ (offset voltage) behaves in the manner described below.

Figure 6A:
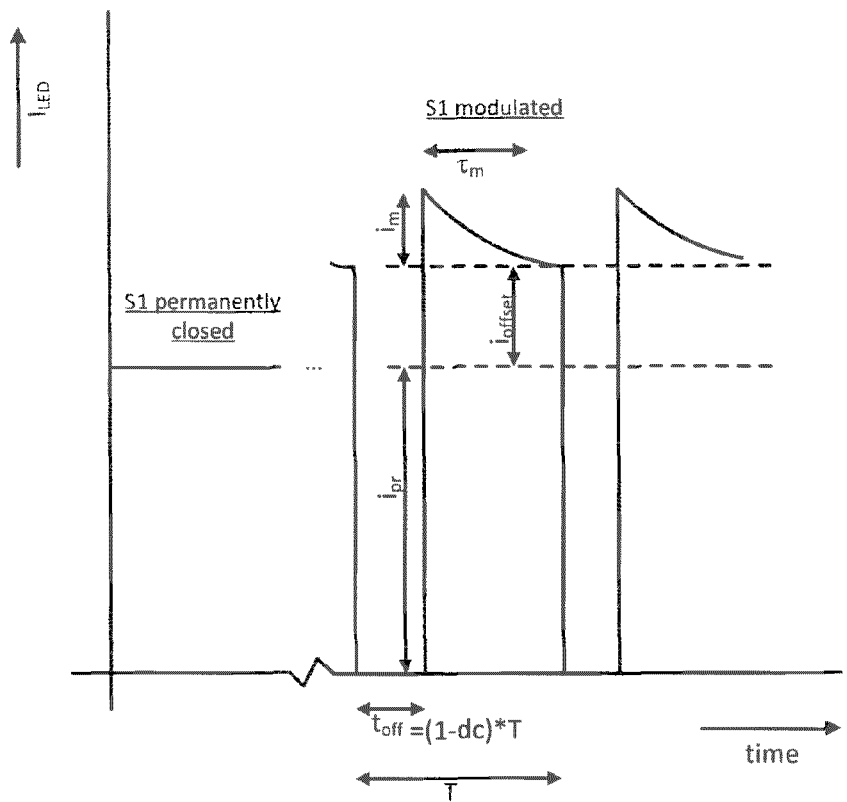
FIG. 6A is a graph illustrating how a drive current used to drive a lighting element changes over time.
Figure 6B:
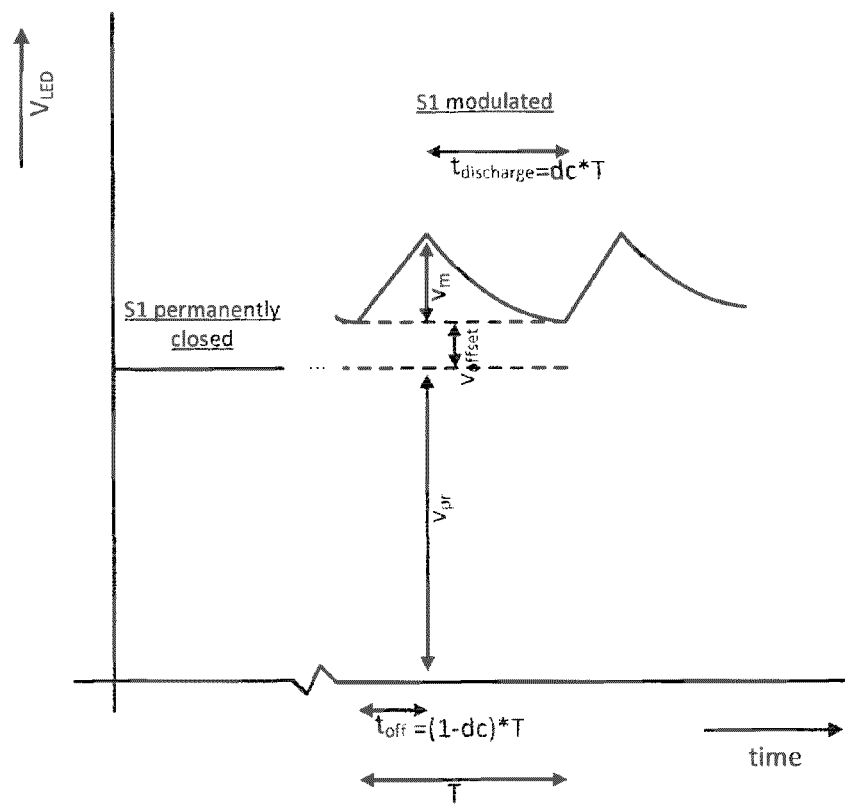
FIG. 6B is a graph illustrating how a voltage across a driver changes over time.

When S1 is closed again (FIG. 4B) the capacitor 53 provides a discharge current $i_{dis}$ so that the LEDs are driven by a drive current $I_{LED}=i_{pr}+i_{dis}$. The LED current becomes $I_{LED}=i_{pr}+i_{offset}+i_m$, where $i_m$ is determined by $v_m/R_s$. Because of the higher voltage on the capacitor, the LED string will consume more power than is delivered by the converter 52. As a result the buffer capacitor will start discharging with time constant $\tau_m=C_{buffer}*R_s$. The capacitor will keep discharging for the duration $t_{discharge}$ ($t_{off}$) over which the switch S1 remains closed, so that the LED voltage $V_{LED}$ and current $I_{LED}$ decay to $v_{pr}+V_{offset}$ and $i_{pr}+i_{offset}$ (i.e. by $v_m$ and $i_m$) respectively; $i_{offset}$ behaves in the manner described below. This is illustrated in FIGS. 6A and 6B which shows graphs illustrating the manner in which the LED current $I_{LED}$ and voltage $V_{LED}$ across the capacitor change over time as switching is performed to open and close the switch periodically. These drawings show a schematic representation of a state where S1 is permanently closed, and a subsequent state where S1 is modulated.

When S1 is permanently closed, once equilibrium is reached, the LED voltage and current remain at $v_{pr}$ and $i_{pr}$ respectively.

Following a switch to the state in which S1 is modulated, $v_m$ remains substantially constant; $i_m$ will increase slightly as the voltage $V_{LED}$ increases (due to the I-V curve of the LED); $i_{offset}$ (offset current) and $v_{offset}$ (offset voltage) will rise until an equilibrium is reached again, which happens when the energy added in the capacitor during $t_{off}$ is equal to the energy taken from the capacitor during period $t_{on}$. With low capacitor voltage, more energy is stored than released. With high capacitor voltage, more energy is released than added. So $v_{offset}$ will increase until the equilibrium has been reached. The offset current $i_{offset}$ is directly related to the offset voltage $v_{offset}$. Equilibrium will typically be reached over multiple switching cycles of S1. Note that FIGS. 6A and 6B only show $I_{LED}/V_{LED}$ at times of equilibrium.

In embodiments where a constant power source is used in place of the constant current source 52, $v_m$ will have a decreasing value until equilibrium has been reached.

The switching occurs with a period T (the coded light frequency being 1/T), and duty cycle dc<1. Switching with a duty cycle dc means that the switch is closed for a fraction dc of the switching period T, i.e. for a time $dc*T=t_{discharge}$, and open for the remaining fraction (1−dc) of the switching period T, i.e. for a time $(1-dc)*T=t_{off}$.

The power delivered to the circuit is independent of the switching strategy for switch S1—changing the switching strategy simply changes when the power is delivered to string 54, and how much is delivered indirectly via the capacitor 53 relative to the amount that is delivered directly from the current source 52.

The only losses are minimal, parasitic losses because of series resistance of the capacitor, making the system highly efficient.

Figure 5:
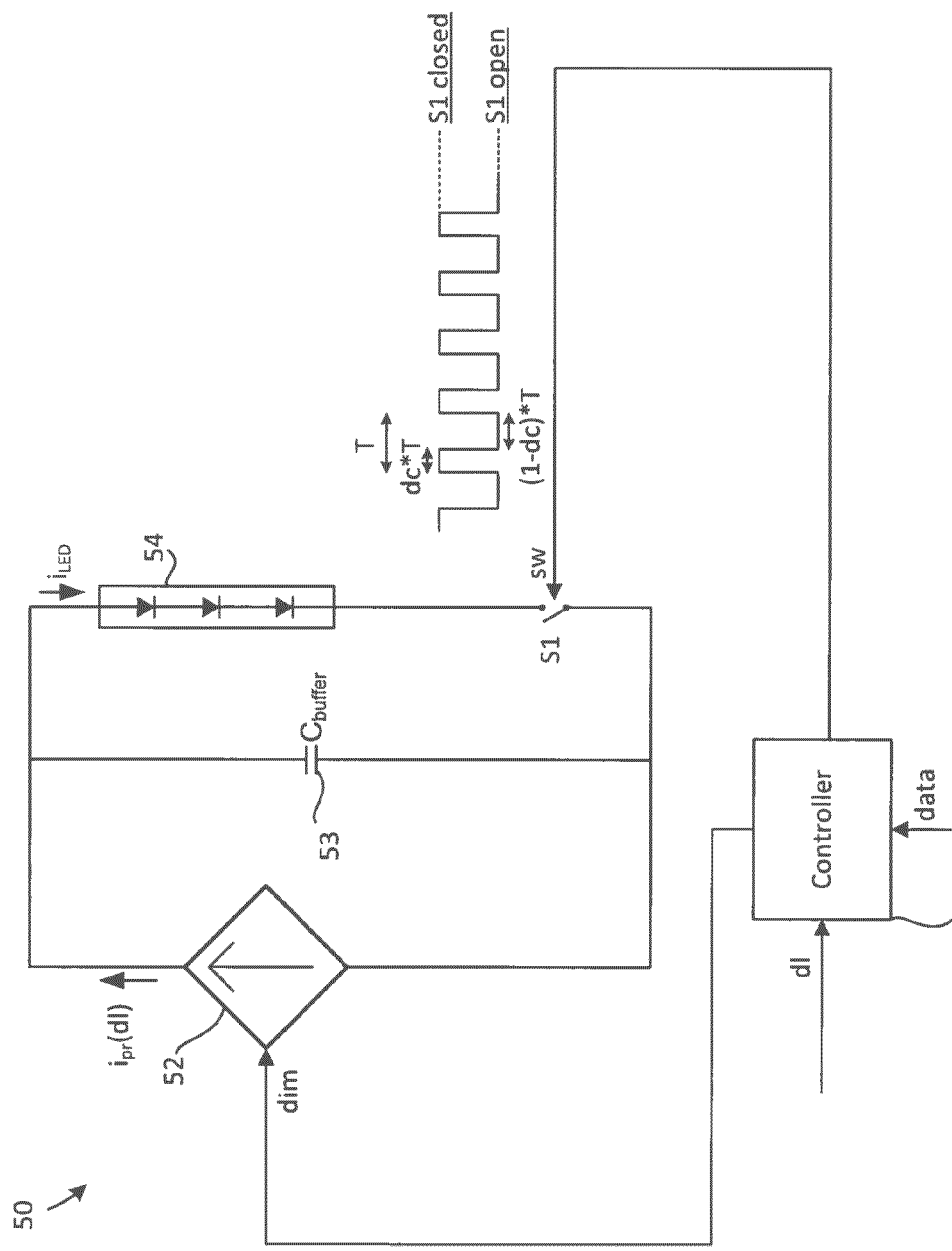
FIG. 5 schematically illustrates the manner in which the illumination system is controlled.

FIG. 5 is another schematic illustration of the lighting apparatus 50, which is shown to comprise a controller 56 in addition to the components described above. As shown the controller 56 has a first input by which a desired dimming level dl is conveyed to the controller, and a second input by which data to be modulated into the light is conveyed to the controller. The controller has a first output by which a dimming signal dim is conveyed to the current source 52, and a second output by which a switching signal sw is conveyed to the switch to open and close the switch. The switch S1 can implemented by a transistor, and the switching signal supplied to the base terminal thereof.

The dimming level dl indicates the average power of the light generated by the string 54 that is currently desired (as a fraction of the maximum power output), and a change in the dimming level indicates that a change in the average power is desired. The dimming signal dim controls the setpoint of the current source 52. When the dimming level dl is changed, the controller adjusts the setpoint to match the primary current $i_{pr}$ to the new dimming level. The dimming signal thus sets the primary current $i_{pr}$, which is sometimes denoted herein as $i_{pr}(dl)$ for that reason. A change in the dimming signal dim indicates a change in the desired dimming level dl, and thus also indicates that a change in the average power of the light generated by the string 54 is desired.

In this embodiment, the data is modulated into the light generated by the string 54 by changing the frequency of the switching signal to change the frequency at which the switch S1 is opened and closed.

The controller can be implemented in hardware circuitry, software (i.e. by code executed on a suitable processor) or a combination of both. The dimming level dl may for instance be inputted as a digital signal, or in an analogue fashion e.g. by tuning a potentiometer.

For reasons discussed below, the controller also controls the duty cycle of the switching signal in dependence on the dimming level dl: light is modulated by opening and closing the LED circuit with the switch S1 at the desired modulating frequency, while at the same time the switching signal sw is operated at a duty cycle that has a direct relationship with the required dimming level dl. In this manner, the duty cycle is changed responsive to changes in the dimming signal (and thus responsive to changes in the primary current $i_{pr}$) dim by virtue of this dependence on the dimming level dl.

The LED's are a very significant part of the system cost of the system. With a fixed duty cycle, the peak LED current could exceed the nominal current. For example with a duty cycle 50% and dimming level 90%, the peak current would become 1.8 times the nominal current. This is because the same power (90% of nominal) needs to be delivered in only 50% of the time. As indicated, higher current will lead to a lower LED efficacy which will lead to an operating temperature that is above the maximum thereby shortening the life of the LEDs. With a fixed duty cycle, this would need to be compensated for by adding additional LED modules (more LEDs lead to a lower LED current for same total flux, which leads to a better efficacy, which leads to a lower temperature). This will introduce additional costs.

The present driver avoids this by implementing a switching strategy that keeps the duty cycle of the switching matched to the dimming level as the diming level varies so that the maximum LED current max $I_{LED}$ (after closing the switch) does not exceed the current at 100% intensity i.e. so that it does not exceed the nominal current of the $i_{nom}$ string 54. Thus, with the present switching strategy, the addition of the coded light feature will not increase the maximum LED current of the system. The present lighting apparatus 50 is thermally as a result limited: the LED modules stay just below their maximum operating temperature because the current though them never exceeds the nominal current of the string 54.

The simplest implementation is that the duty cycle is equal to the dimming level (e.g. if the lamp is operated at 80% of its nominal light output, the duty cycle should by 0.8). So, for instance, if dl=0.9, S1 is closed for 0.9× coded light period T, and S1 is open for 0.1× coded light period T. It can be shown by way of a straightforward power analysis that $$\max I_{LED} = i_{nom} * \frac{dl}{dc}$$

neglecting the voltage swing on the capacitor and the parasitic losses. Thus, when the duty cycle is chosen equal to the dimming level, the peak current max $I_{LED}$ will remain constant at the nominal current of the string for all dimming levels.

Figure 8:
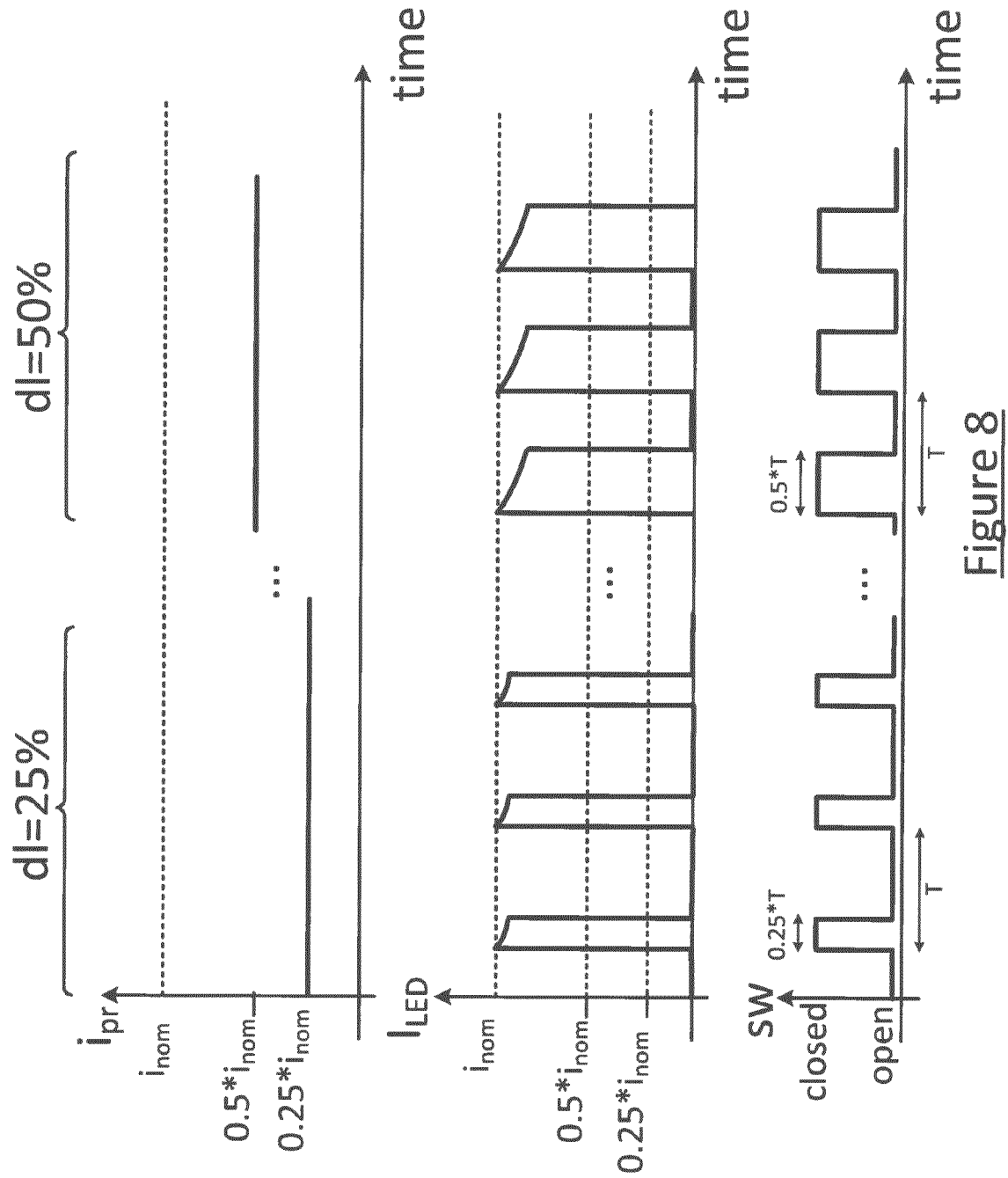
FIG. 8 schematically illustrates a switching strategy which regulates an LED current.

This is illustrated in FIG. 8, which shows graphs of the primary current, LED current and switching signal sw when the dimming level dl is at 25% and then changed to 50%. By matching the duty cycle to the dimming level, the peak LED current is maintained at $i_{nom}$ as $i_{pr}$ changes from $0.25*i_{nom}$ to $0.5*i_{nom}$ to effect the analogue dimming.

Figure 7:
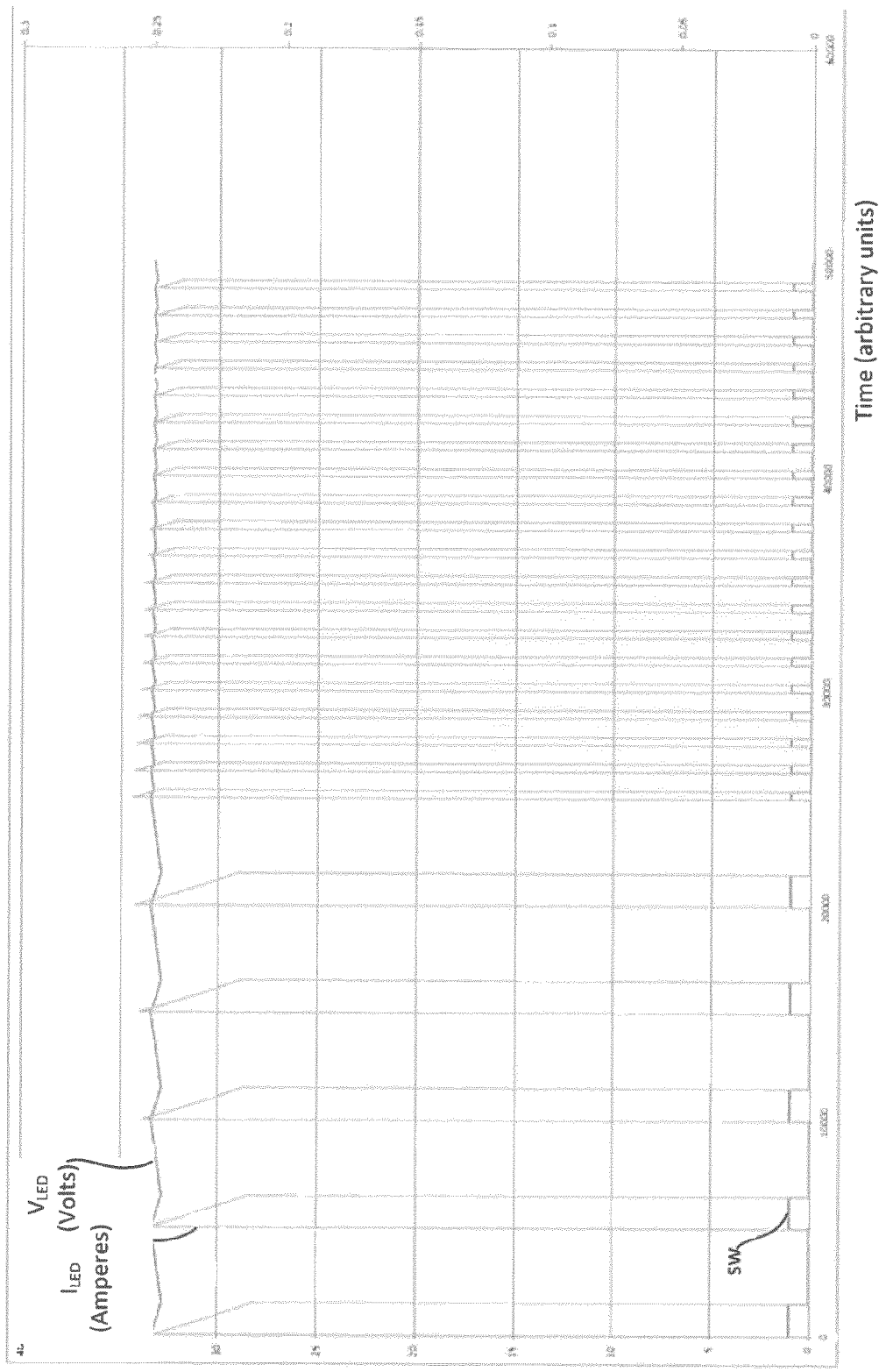
FIG. 7 is a graph showing simulated results for a driver of one embodiment.

Other relations between duty cycle and dimming level are possible as will be apparent i.e. any relationship between the duty cycle and the dimming level that keeps the peak LED current at or below the nominal current of the string 54, which is satisfied for any relationship such that dc≥dl. FIG. 7 shows a graph of simulated behavior of the apparatus 50 for a string of 10 LEDs, in which the switching undergoes a change in frequency from 200 Hz to 800 Hz. The graph shows how the led current $I_{LED}$ (in Amperes), voltage across the capacitor 54 VLED (in Volts) and switching signal SW change over time (horizontal axis, measured in arbitrary units). The dimming level is held constant at 30% throughout the duration spanned by the graph of FIG. 7. The rising/falling in FIG. 7 is due to the following: the LED models used in the simulation also incorporate (small) non-linearities in the current to voltage relation of the LEDs. That's why the current will be marginally different for different frequencies.

The nominal current $i_{nom}$, represents the maximum 'safe' current that can be delivered to the string 54. Determining the nominal current generally involves two considerations. The first consideration is any nominal rating of the lighting element or its component LEDs specified as being 'safe' by the manufacturer of the lighting element or LEDs—where this is the limiting factor in the design, the predetermined level may be set to match this. The second consideration is that the peak current needs to be limited to obtain a certain minimum LED efficacy. The efficacy of a LED changes with the (peak) current. In general the efficacy of a LED decreases when the peak current increases. From a thermal design perspective, the heat generated by the LED's cannot exceed a certain design requirement. Therefore the efficacy needs to be controlled, which in turn results in a need to control the peak current. In other words, if the efficacy is the limiting factor in the design, the maximum allowed peak current of the LED will be below the maximum current as specified by the manufacturer of the LED.

The thermal equilibrium of a bulb-like product is very sensitive to changes in the LED efficacy, which in turn is sensitive to the drive current $i_{pr}+i_{dis}$ In practice, a temperature (over)protection circuit may be used to keep the temperature within acceptable limits with respect to LED lifetime by reducing the primary current when the temperature of the lighting element increases above a predetermined limit so as to reduce the drive current of the LED's. When the peak current of the LEDs is limited by (i.e. when the nominal current $i_{nom}$ is set by) the thermal properties of the lamp system (rather than the maximum drive current as specified by the LED manufacturer), driving the LEDs at a peak current above $i_{nom}$ will lead to a temperature increase above nominal in practice. So driving the circuit at e.g. 102% (i.e. so that max $I_{LED}=1.02*i_{nom}$) for a prolonged period of time will not impact the LED lifetime, but will cause the temperature protection circuit to reduce the output flux of the lamp instead.

Whether or not the reduction in the LED lifetime (if no temperature protection is used) or the flux (if temperature protection is used) caused by driving the LEDs by above $i_{nom}$ is acceptable depends on the LED configuration and the thermal design of the lamp—as an upper limit, driving the LEDs so that the peak drive current is 110% of $i_{nom}$ is not acceptable for most designs.

In practice, lighting apparatus designs need to take into account production tolerances in the LED's as well as different environmental circumstances (e.g. whether the lamp is in free air or enclosed in a luminaire).

For a worst case sample in a worst case environment, driving the LEDs even at a peak drive current of, say, 100.5% of $i_{mon}$ will increase the temperature to a level where either LED life time is reduced slightly (if no over temperature protection circuit is used) or the flux will be reduced slightly when using coded light for a short time (if temperature protection is used). In other words, the 100% mark (i.e. max $I_{LED}=i_{nom}$) is not a hard limit, but from this point on one would expect to see gradual degradation of the product population (though not necessarily every individual product); either in life time (without over temperature protection) or in flux output (with over temperature protection). Whether or not a certain such degradation is acceptable depends on the exact product design and how close it has been designed to the limit.

Any coded light implementation has to comply with several requirements to make it feasible for implementation in a lamp platform:
1. No visible change in light level and/or flicker when using coded light;
2. Very low cost;
3. Good modulation depth within acceptable limits;
4. No degradation in lamp efficacy (lumen per watt) at maximum power output (i.e. when operating at the nominal power).

The use the series switch S1 combined with the output capacitor 54 has the benefit over other driver circuits that it does not introduce any additional losses (which would otherwise reduce lamp efficacy), provides a good modulation depth within acceptable limits: there is a minimum and a maximum value for the duty cycle, below/above which the frequency cannot be detected. If the dc≥dl relation is strictly followed, coded light modulation cannot be detected for dimming levels close to 100% (as dc must be close to 1 in that event). However, in the case that the maximum peak current is limited by thermal requirements (see above), it is acceptable to temporarily exceed the maximum as long as the duration over which this happens is much smaller than the thermal time constant of the lamp (typically in the order of minutes). This allows the light to be modulated at 100% light output (dl=1): in that event, the peak current will exceed the nominal current, which is acceptable provided it is only for a short amount of time (until the modulated signal has been detected)—e.g. less than a minute. As the typical usage time of a coded light signal is typically below 1 minute in any event, this does will not generally impact on coded light performance.

As indicated above, for most lamp/environment combinations, it is possible to go beyond the 100% of $i_{nom}$ limit (e.g. to 100.5%) for a limited amount of time (e.g. less than a minute), without reducing the lifetime of the LEDs or triggering the over temperature protection circuit (if used)— in the worst case lamp/environment combination, a slight reduction in LED lifetime (without temperature protection) or a slight decrease in the flux during coding with at dl=1 (with temperature protection) may occur, but as mentioned this may be acceptable on the exact product design and how close it has been designed to the limit.

The subject matter is also cheap to implement. For instance, some existing analogue dimmer drivers already have an output capacitor parallel to the LED string; moreover, existing lamps that can be controlled using an RF channel already have a microprocessor present (to implement the controller of this disclosure); thus all that is needed to implement the present teaching is the addition of a single transistor to implement the switch. What is more, for embodiments in which the duty cycle matches the dimming level, in some existing analogue dimmer drivers, a dimming level signal is already provided which can be re-purposed to control the separate switch as well as the analogue dimming (i.e. a new signal need not be generated).

Moreover, the switching strategy ensures that the lamp efficacy is not reduced at maximum power output as a result of the introduction of the coded light functionality.

The present disclosure thus provides coded light operation in combination with a single stage driver which meets all of the above feasibility requirements.

The present teaching can be applied to all driver types that have an output capacitor parallel to the LED string and that have a slow control bandwidth (lower that the modulating frequencies required for coded light).

In the above, a frequency modulation scheme is presented, in which data is embedded in the light generated by the LED string 54 by changing the frequency of the switching.

In alternative embodiments, data is embedded in the generated light by modulating the duty cycle of the switching. The frequency is chosen equal to a desired symbol frequency in this case and may be fixed.

The duty cycle may be modulated using ternary Manchester encoding, described in international patent application publication no. WO2012/052935. Ternary Manchester encoding is DC-free, and can be advantageous as it provides a smoother transition when the data bits change value than a conventional Manchester code, and results in a spectrum in the frequency domain that is more suppressed around low frequencies where interference such as mains hum may occur.

As is known in the art, in ternary Manchester encoding, a signal property (in this case the duty cycle of the switching) is modulated between 3 values, typically labeled −1, 0 and +1—in this instance, each of −1, 0 and +1 is represented by a different duty cycle.

The signal can be modulated in the following way: if $dc_d$ is the duty cycle that is desired in relation to the dimming level to keep the peak current below the nominal current, −1, 0 and 1 can be represented by $dc_d$, dc− and dc+ respectively, where dc− and dc+ are for instance $dc_d-dc_0$ and $dc_d+dc_0$ respectively, and $dc_0$ is e.g. 0.1. In a single period, the actual duty cycle of the switching will be $dc_d$, dc− or dc+; however, the actual peak current max $I_{LED}$ will be related to the average duty cycle, which is equal to $dc_d$ because of the DC-free property of the encoding (in practice, if the capacitor is too small this may not quite hold and the peak current may be slightly too high but in this case a small adjustment to $dc_d$ could be made to get the peak current back down to or below the level of the nominal current). Thus, if the relationship $dc_d \geq dl$ is maintained, this will prevent the peak current from exceeding the nominal current (e.g., the peak current can be maintained at a substantially constant level by maintaining the relationship $dc_d=dl$).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An analogue dimmer driver for driving an LED lighting element to generate coded light, the driver comprising:
   an output component configured to provide a primary current ($i_{pr}$), wherein the output component is one of a controllable constant current source and a controllable constant power source;
   a capacitor connected to the output component;
   a switch via which the lighting element is connectable to the output component in parallel with the capacitor, so that when the switch is open the primary current charges the capacitor, and when the switch is closed the capacitor discharges to generate a discharge current ($i_{dis}$) so that the lighting element is driven by a drive current ($i_{pr}+i_{dis}$) which comprises the discharge and primary currents; and
   a controller configured to perform switching by periodically opening and closing the switch to code information into light generated by the lighting element, wherein the switching is performed with a duty cycle, wherein the duty cycle is a fraction of the switching period during which the switch is closed, wherein the switching period is a period during which the switch changes from closed to open and then from open to closed once;
   wherein the controller has an input by which a desired dimming level is conveyed to the controller, the desired dimming level representing a fraction of a nominal power or current of the LED lighting element;
   wherein the output component has an input configured to receive from the controller a dimming signal corresponding to the desired dimming level (dl); and
   wherein the controller is configured to both control the duty cycle and adjust the dimming signal in dependence on the desired dimming level, such that responsive to a change in the dimming level which indicates that an increase in the average power of the generated light is desired: i) the primary current is increased so as to increase the average power of the generated light and ii) the duty cycle (dc) of the switching is increased such that it is greater than or equal to the dimming level (dl), thereby preventing the peak level of the drive current from exceeding a predetermined level ($i_{nom}$).

2. The analogue dimmer driver according to claim 1 wherein the peak level of the drive current prior to a change in the dimming level is at the predetermined level and the amount by which the duty cycle is increased is such that the peak level of the drive current remains at the predetermined level.

3. The analogue dimmer driver according to claim 1, wherein the controller has an input configured to receive data and is configured to embed the data in the generated light by changing a frequency of the switching in dependence on the data.

4. The analogue dimmer driver according to claim 1, wherein the controller has an input configured to receive data and is configured to embed the data in the generated light by changing the duty cycle of the switching.

5. The analogue dimmer driver according to claim 1, wherein a frequency of the switching is above 50 Hz.

6. The analogue dimmer driver according to claim 1 wherein the output component comprises a control loop which matches the primary current or an output related to the primary current to a setpoint of the control loop, the primary current increased by increasing the setpoint.

7. The analogue dimmer driver according to claim 6 wherein the output related to the primary current is the electrical power provided by the output component.

8. The analogue dimmer driver according to claim 6 wherein the setpoint is adjusted at a frequency below 50 Hz.

9. The analogue dimmer driver according to claim 6, comprising a low-pass filter, wherein the dimming signal is filtered by the low-pass filter before being received by the output component, and the switching is performed using a version of the dimming level not filtered by the low-pass filter.

10. The analogue dimmer driver according to claim 1 wherein the switch is a transistor.

11. The analogue dimmer driver according to claim 1, comprising a temperature protection circuit configured to reduce the primary current when the temperature of the lighting element increases above a predetermined limit.

12. A lighting apparatus comprising the analogue dimmer driver of claim 1, and the LED lighting element.

13. An apparatus according to claim 12 wherein the predetermined level matches the nominal current associated with the lighting element.

14. A method for controlling an LED lighting element with an analogue dimmer to generate coded light and to achieve a desired dimming level (dl), the lighting element being connected to an output component via a switch in parallel with a capacitor also connected to the output component, wherein the output component is one of a controllable constant current source and a controllable constant power source and the output component is configured to provide a primary current ($i_{pr}$), so that when the switch is open the primary current charges the capacitor, and when the switch is closed the capacitor discharges to generate a discharge current ($i_{dis}$) so that the lighting element is driven by a drive current (i which comprises the discharge and primary currents, the method comprising:
  performing switching by periodically opening and closing the switch to code information into light generated by the lighting element, wherein the switching is performed with a duty cycle, wherein the duty cycle is a fraction of the switching period during which the switch is closed, wherein the switching period is a period during which the switch changes from closed to open and then from open to closed once; and
  receiving an indication of a desired dimming level representing a fraction of a nominal power or current of the LED lighting element; and
  responsive to a change in the dimming level indicating that an increase in the average power of the generated light is desired:
  i) increasing the primary current so as to increase the average power of the generated light, and
  ii) increasing the duty cycle (dc) of the switching such that it is greater than or equal to the dimming level (dl), thereby preventing the peak level of the drive current from exceeding a predetermined level ($i_{nom}$).

15. A computer program product comprising code stored on a computer readable storage medium which, when executed, implements the method of claim 14 on a controlled LED lighting element.

* * * * *